United States Patent
Kim et al.

(10) Patent No.: US 8,613,016 B2
(45) Date of Patent: Dec. 17, 2013

(54) APPARATUS FOR RECEIVING ADAPTIVE BROADCAST SIGNAL AND METHOD THEREOF

(75) Inventors: Jin Pil Kim, Seoul (KR); Ho Taek Hong, Seoul (KR); Jong Yeul Suh, Seoul (KR); Joon Hwi Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1172 days.

(21) Appl. No.: 11/905,494

(22) Filed: Oct. 1, 2007

(65) Prior Publication Data

US 2008/0083004 A1    Apr. 3, 2008

Related U.S. Application Data

(60) Provisional application No. 60/848,366, filed on Oct. 2, 2006.

(51) Int. Cl.
    *H04N 5/445*    (2011.01)
    *G06F 3/00*     (2006.01)
    *H04N 7/173*    (2011.01)

(52) U.S. Cl.
    USPC .............. 725/38; 725/54; 725/87; 725/93

(58) Field of Classification Search
    None
    See application file for complete search history.

(56) References Cited

U.S. PATENT DOCUMENTS

| | | | |
|---|---|---|---|
| 5,850,527 A * | 12/1998 | Suzuki | 709/247 |
| 6,020,880 A | 2/2000 | Naimpally | |
| 6,314,565 B1 * | 11/2001 | Kenner et al. | 717/171 |
| 7,224,404 B2 | 5/2007 | An et al. | |
| 2001/0047517 A1 | 11/2001 | Christopoulos et al. | |
| 2005/0157660 A1 | 7/2005 | Mandato | |
| 2006/0152488 A1 | 7/2006 | Salsman et al. | |
| 2006/0174277 A1 | 8/2006 | Sezan et al. | |
| 2007/0113246 A1 | 5/2007 | Xiong | |
| 2007/0204311 A1 | 8/2007 | Hasek et al. | |
| 2008/0069006 A1 * | 3/2008 | Walter et al. | 370/252 |

FOREIGN PATENT DOCUMENTS

| | | |
|---|---|---|
| CN | 1411278 A | 4/2003 |
| CN | 1713720 A | 12/2005 |
| CN | 1816053 A | 8/2006 |
| KR | 10-2006-0065968 | 6/2006 |

OTHER PUBLICATIONS

Authors: Ismail Djama, et al.; Title: "An MPEG-21-enabled Video Adaptation Engine for Universal IPTV Access"; Internet Article, [Online] Apr. 2006, pp. 1-7, XP002463992.
Authors: Focus Group on IPTV, ETRI: Tilte: "Media Adaptation to Usage Environments for IPTV Services" Internet Article, [Online] Jul. 10, 2006-Jul. 14, 2006 pp. 1-8, XP002463993.

(Continued)

*Primary Examiner* — Jason J Chung
*Assistant Examiner* — James R Marandi
(74) *Attorney, Agent, or Firm* — McKenna Long & Aldridge, LLP

(57) ABSTRACT

An apparatus for receiving an adaptive broadcast signal and method thereof are disclosed. The present invention includes linking an IP network, sending supported codec information for a receiver to a service provider via the linked IP network, receiving an available service information list provided by the service provider based on the supported codec information for the receiver, and if at least one service is selected from the received available service information list by a user, providing the selected service to the receiver.

8 Claims, 11 Drawing Sheets

(56) References Cited

OTHER PUBLICATIONS

Authors: WG1 Chair: Title: "IPTV Framework Architecture Model" Internet Article, [Online] Jul. 10, 2006-Jul. 14, 2006, pp. 1-45, XP002463994.

Steigr O. et al:"MPEG-based personalized content delivery", Proceedings 2003 International Conference on Image Processing (Cat. No. 03CH37429), Barcelona, Spain, Sep. 14-17, 2003; [International Conference on Image Processing], IEEE, IEEE Piscataway, NJ, USA, vol. 3, Sep. 14, 2003, pp. 45-48, XP010670365, ISBN: 978-0-7803-7750-9.

* cited by examiner

FIG. 10

Display Resolution

| Field name | bits | description |
|---|---|---|
| Command | 8 | send resource information |
| Resolution information | | RI_structure |
| Audio CODEC information | | AC_structure |
| Video CODEC information | | VC_structure |
| Network Information | | NI_structure |
| User Level Information | | ULI_structure |

FIG. 11

| Codec type | Value | Description |
|---|---|---|
| ISO / IEC 11172 Video | 0 | MPEG1 video |
| ITU-T Rec. H.262 | ISO/IEC 13818-2 Video | 1 | MPEG2 video |
| ISO / IEC 14496-2 Visual | 2 | MPEG4 video |
| ITU-T Rec. H.264 | ISO / IEC 14496-10 | 3 | H.264 video |
| SMPTE 421M video | 4 | VC-1 video |
| ISO / IEC 11172-3 Audio | 5 | MPEG1 audio |
| ISO / IEC 13818-3 Audio | 6 | MPEG2 audio |
| ISO / IEC 13818-7 Audio with ADTS transport syntax | 7 | AAC |
| ISO / IEC 14496-3 Audio | 8 | MPEG-4 audio |
| ISO / IEC 23001-1 | 9 | MPEG Surround |

FIG. 12

RI_Structure

| Field name | bits | description |
|---|---|---|
| Number_of_available_Codec_list | 4 | |
| For ( I = 0; to Number_of_available_Codec_list; I++) | | |
| { | | |
|     code_value | 5 | |
|     text | var | |
|     codec_type | var | |
| } | | |

FIG. 13

RI_Structure

| Field name | bits | description |
|---|---|---|
| { | | |
| code_value | 5 | |
| text | var | |
| codec_type | 4 | |
| } | | |

APPARATUS FOR RECEIVING ADAPTIVE BROADCAST SIGNAL AND METHOD THEREOF

This application claims the benefit of U.S. Provisional Application No. 60/848,366, filed on Oct. 2, 2006, in the name of inventors Jin Pil KIM, Ho Taek HONG, Jong Yeul SUH and Joon Hwi LEE, titled "APPARATUS FOR RECEIVING ADPATIVE BROADCAST SIGNAL AND METHOD THEREOF", which is hereby incorporated by reference.

BACKGROUND

1. Field

The present disclosure relates to an apparatus for receiving an adaptive broadcast signal and a method thereof, and more particularly, to a broadcast receiver and broadcast receiving method. Although the present invention is suitable for a wide scope of applications, it is particularly suitable for receiving an adaptive broadcast signal according to a receiver environment.

2. Discussion of the Related Art

FIGS. 1A to 1C show a broadcast receiving method according to a related art.

Referring to FIGS. 1A to 1C, in a related art TV, contents provided by a broadcasting station are transmitted via a radiowave transferring medium such as a broadcast network and the like by a cable broadcast provider, a terrestrial broadcast provider or a satellite broadcast provider. A viewer receives a corresponding service in a manner of viewing the contents via a TV receiver capable of receiving each of the transfer media.

As the digital based TV technology has been developed and commercialized from the conventional analog TV broadcasting, various contents including real-time broadcasting, CoD (contents on demand), games, news and the like can be provided to viewers via Internet networks connected to home as well as the conventional radiowave media.

As an example of the contents providing via the internet network, there is an internet protocol TV (IPTV). The IPTV means a service for providing information services, moving picture contents, broadcasts and the like to a television using high-speed internet networks.

The IPTV is identical to normal cable broadcasting or satellite broadcasting in providing broadcast contents including video. Yet, the IPTV is characterized in having bi-directionality in addition. Differing from terrestrial broadcasting, cable broadcasting or satellite broadcasting, the IPTV enables a user to view a specific program at a specific time convenient to the user.

Meanwhile, a viewable stream is decided according to a codec type supported by a broadcast receiver.

However, since contents coded by a codec provided by a service provider are uniformly received, it is occasionally unable to decode to output a received broadcast stream.

SUMMARY

Accordingly, the present invention is directed to an apparatus for receiving an adaptive broadcast signal and method thereof that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving an adaptive broadcast signal according to the present invention includes the steps of linking an IP network, sending supported codec information for a receiver to a service provider via the linked IP network, receiving an available service information list provided by the service provider based on the supported codec information for the receiver, and if at least one service is selected from the received available service information list by a user, providing the selected service to the receiver.

In another aspect of the present invention, a method of receiving an adaptive broadcast signal includes the steps of linking an IP network, sending supported codec information for a receiver and program selection information to a service provider via the linked IP network, and providing the receiver with at least one service in available service information for a program selected by a user based on the sent supported codec information.

In a further aspect of the present invention, an adaptive broadcast receiver includes a network interface unit transceiving a broadcast stream capsulated into an IP packet by connecting the broadcast receiver to a service provider via a network, a control unit controlling a version of contents encoded by a codec decodable by the broadcast receiver to be received in a manner of sending supported codec information for the broadcast receiver to the service provider via the network interface unit, a decoder decoding the received broadcast stream, and a display unit outputting the broadcast stream decoded by the decoder.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 10 is a diagram of a data structure to send resource information for a broadcast receiver to a service provider from the broadcast receiver according to an embodiment of the present invention;

FIG. 11 is a diagram for encoding of codec information to support a service provider with supported codec information according to one embodiment of the present invention;

FIG. 12 is a diagram of a data structure to send supported codec information for a broadcast receiver to a service provider from the broadcast receiver according to an embodiment of the present invention;

FIG. 13 is a diagram of a data structure for indicating available service information sent from a service provider to a broadcast receiver according to an embodiment of the present invention.

DETAILED DESCRIPTION OF THE INVENTION

Reference will now be made in detail to the implementations, examples of which are illustrated in the accompanying drawings. Wherever possible, the same reference numbers will be used throughout the drawings to refer to the same or like parts.

Figure 1A:
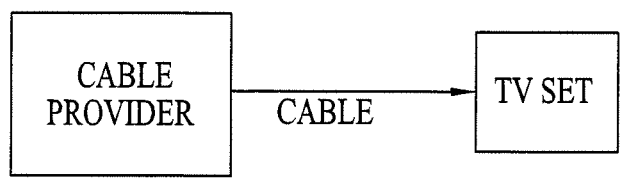
FIGS. 1A to 1C are diagrams for a broadcast receiving method according to a related art.
Figure 1B:
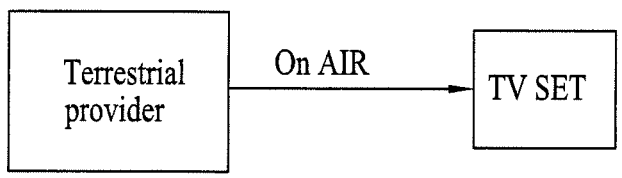
Figure 1C:
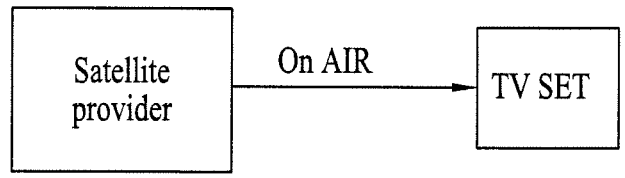
Figure 2:
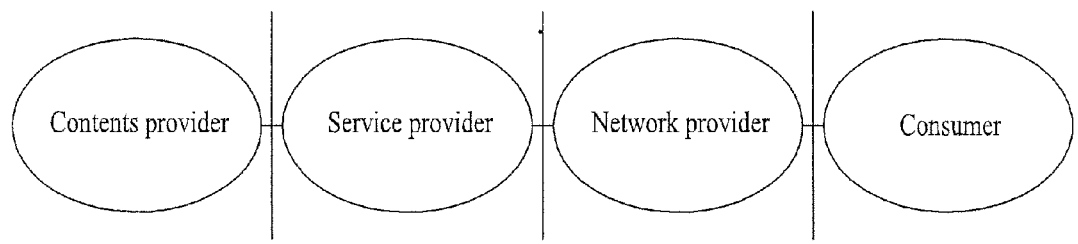
FIG. 2 is a diagram for system layers of IPTV (IP television)

FIG. 2 is a diagram for system layers of IPTV (IP television).

Referring to FIG. 2, an IPTV system includes a contents provider layer, a service provider layer, a network provider layer, and a consumer layer.

The contents provider plays a role in providing the service provider with contents.

The service provider plays a role in providing a service to a subscriber. And, the service provider collects various contents, transforms signals to fit an IP environment, and then delivers the transformed signals to the consumer. In this case, the service provider may correspond to a virtual existence and the contents provider can be the service provider.

The network provider plays a role in connecting the consumer and the service provider together via IP network.

A transport system can use various networks including an access network, a backbone network, etc. The consumer is the layer for receiving a broadcast by being provided with contents. And, the consumer includes a set-top box, a personal computer (PC), a mobile terminal or the like.

A concept of the IPTV is explained in detail in the following description.

Figure 3:
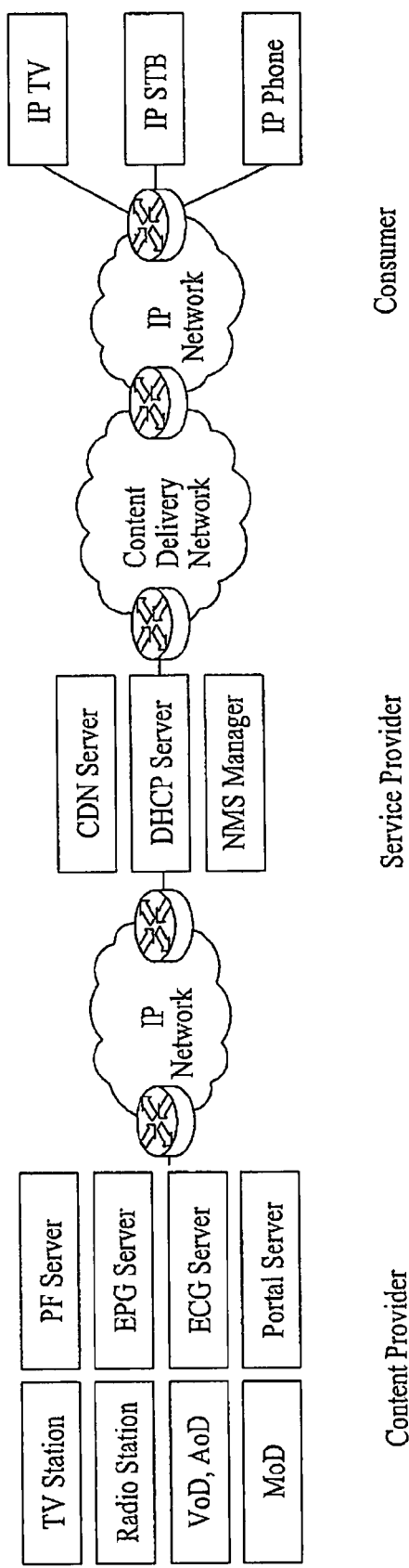
FIG. 3 is a characteristic diagram for IPTV system.

FIG. 3 is a characteristic diagram for IPTV system.

Referring to FIG. 3, system layers of IPTV can be mainly categorized into a contents provider, a service provider, and a consumer. The contents provider can be called a platform provider as well. The three kinds of groups play different roles, respectively.

The contents provider can indicate a group that provides overall services and data for broadcast programs.

The service provider transmits multimedia data. The service provider provides the consumer with maintenance and management to enable stable reception of contents. And, the service provider provides the contents provider with the infrastructure and functions for capability of network transmission.

And, the consumer group plays a role in playing data inputted using such an infrastructure as XDSL, cable and the like or responding to a user request promptly. The consumer group mostly includes manufacturers for manufacturing IPTVs and its kinds can be categorized into IPTV, IP STB, IP Phone, and the like. The respective groups are explained in detail as follows.

First of all, the contents provider group may include a TV station that produces a broadcast program. The TV station means a conventional terrestrial broadcasting station or a cable broadcasting station. These broadcasting stations produce and store programs viewable by consumers and are capable of converting the programs digitally to be transmitted. This is to enable various broadcasting types to be transmitted.

A radio station means a general radio broadcasting station and may have a video channel in some cases. Yet, the radio station is mostly operated without video channel. VoD (video on demand) or AoD (audio on demand) service has characteristics different from those of the TV station or the radio station.

The contents provider may store and keep a program to be broadcasted. Yet, this program is a live broadcast with continuity. So, this program is characterized in being unable to be rewound or paused to be viewed unless being recorded.

Yet, in case of VoD or AoD, a specific broadcast program, movie or music can be stored and then played later to be viewed. For instance, if a broadcast program is currently missed to view due to lack of time, a site providing the broadcast service is accessed to download a corresponding file or play the downloaded file directly. Likewise, the AoD provides a function of recording an audio program or playing an audio program by real time. MoD (music on demand) service enables a user to download a specific music to listen to. Targets of the MoD service can be implemented in a manner that a phonograph record manufacturer or distributor expands a conventional web service.

An embodiment of a service provided by a contents provider group is explained as follows.

First of all, a PF server can be serviced by a company that manages all broadcast information and location information provided by the contents provider. This service mainly contains location information necessary for a broadcast time or broadcast of a corresponding broadcasting station and information for enabling a customer to access the corresponding broadcasting station. The customer is able to obtain and display this information on a screen. The PF server is one of the services mandatory for each broadcasting station. In the IPTV environment, this service is provided to enable a customer to access a corresponding broadcasting station.

EPG service is one of convenient services provided to enable a customer to inquire a broadcast program per a time zone and recognize a broadcast program per a channel. The EPG service is configured to be executable in a manner that a corresponding program is automatically installed at a customer side in advance.

A customer is able to obtain the information for a corresponding broadcasting station only from a PF server. Yet, the EPG service enables a customer to obtain information for real-time broadcast channels of all broadcasting stations at a time. So, the EPG service can be very conveniently usable. For instance, the EPG service is provided with a powerful function of making a reservation for recording CNN news or a reservation for viewing Disney channel. So, the EPG service should provide details of information for broadcast programs in a corresponding area per a time zone. In particular, in case of a prescribed drama, contents of the drama are searched. The broadcast programs can be categorized into SF, drama, animation, and the like for discrimination. Detailed information for a story or characters of a movie or drama of a simple broadcast program can be included.

One big problem of the EPG service is how to transmit EPG data suitable for a customer due to too many kinds of licenses of customers who view IPTV. To access the EPG service, a customer finds and presses an input key of a remote controller with ease.

ECG service has all kinds of functions for facilitating a customer to use information for contents possessed by a contents provider, a location of an access server, an access authority and the like. In brief, the functions include a function of facilitating servers having contents to be accessed and an electronic program guide (EPG) indicating details of information for contents.

In particular, a load in individually accessing a prescribed content service to view or download contents can be reduced in a manner of binding services including AoD, MoD and VoD into one such as EPG except a real-time broadcast.

Similar to the EPG service, the ECG service enables contents stored in a server to be viewed at any time instead of informing real-time broadcast channel information. And, the ECG service enables contents to be downloaded and stored. If a customer attempts to access a server having corresponding contents, the customer has difficulty in obtaining an address or accessing PF servers. This is a very complicated process and consumes considerable time. A company providing ECG enables an ECG program to be automatically installed in a customer, collects information for all kinds of contents, and provides the corresponding data. In order to access an ECG service, a customer just clicks an input key button on a remote controller as well.

A portal server is connected to a broadcasting station via a web service provided by each broadcasting station or connected to a web server of a company servicing contents. The portal server plays a role in searching or viewing a program list provided by each broadcasting station or each contents provider providing a contents service. This can be considered as a function of ECG or EPG. Yet, a portal service is equipped with such a function as user authentication or license contract. So, an access is needed to view a specific program. Although ECG or EPG provides a unified broadcast or contents list, the portal service provides broadcast or contents list information for a corresponding program providing company to enable detailed search. In order to access a portal service, a customer just clicks a portal input button on a remote controller.

Thus, the contents provider side should include a function of providing those services and the like. If it is attempted to normally operate the functions, servers of service companies should be access IP network to transmit a corresponding program by real time or transmit broadcast information.

And, the respective broadcasting stations or the service companies should be connected to a network of a service provider for errorless transmission without delay. So, they should have a system for transmitting multimedia data using internet real-time protocol such as RTP, RTSP, RSVP, MPLS and the like.

For instance, in case that a TV studio currently providing news attempts to transmit multimedia by real time, if the multimedia includes MPEG-2 and AC-3 audio specifications, a transcoding work for converting them to fit a format of IPTV should be carried out. After a server for executing this work has been passed, a system is configured in a manner that RTP/UDP protocol including time information for matching caption or lip-sync is attached to pass through IP network provided by a service provider.

The service provider provides stability and bandwidth of network to enable multimedia data and broadcast data to be well transmitted by a contents provider. Service providers are able to provide IPTV services using a conventional cable network. In this case, equipments of delivery network need to be changed. In particular, network equipments capable of real-time data transmission should be provided for configuration and a customer should configure a network by considering a bandwidth. The equipments should reduce a bandwidth by processing massive multimedia data using a multicast service as a basic network service of IPTV. If a bandwidth is not secured, a service provider changes an optical cable network configuration or transcodes multimedia data from a contents provider into MPEG-4 or MPEG-7 formatted data with efforts to secure a bandwidth and then transmits the corresponding data. For this, the service provider should provide several kinds of services including NMS (network management system), DHCP (dynamic host control protocol), and CDN services.

The NMS service enables a service provider to manage a delivery network for a delivery to each customer and an IPTV receiver of the corresponding customer. In particular, in case that a broadcast reception is not available for a customer due to a technical difficulty of a delivery network, a means for emergency processing should be provided.

The NMS is widely used as a standardized means for controlling and managing machined in a remote transport layer. Using this service, it is able to check how many traffics are generated for a prescribed broadcast or which area is in short of bandwidth. The NMS service should be provided to contents providers to enable the corresponding contents provider to generate and manage groups in multicast. This is because more multicast groups may need to be generated occasionally.

The DHCP service enables an IP to be automatically allocated to an IPTV receiver of a customer and is used to inform an address of a CDN server. The DHCP service is a useful means for allocating IP to a PC on a general network. By transmitting an accessible address to an authorized IPTV receiver, a user is allowed to make a registration procedure for an initial access. Generally, an IPTV receiver will provide IPv4. Yet, IPv6 is also available. So, an IPTV receiver providing IPv4 is usable as well.

In the CDN service, when an IPTV receiver is initially operated with data provided by a service provider by receiving a power, CDN information is received from a service provider while IP is received by the DHCP service. This information contains customer registration or authentication of an IPTV provider and the above-explained PF informations. As an IPTV receiver obtains CDN information from a service provider, an IP broadcast signal reception is enabled.

A customer can have various kinds of IPTV receivers. A customer having a normal TV rents IPTV STB to enjoy an IPTV inexpensively. A service provider pays an additional service charge with a low price and a customer requests an IP phone to use together.

An IPTV receiver basically includes a network interface capable of accessing a network and has an Internet protocol. The IPTV receiver receives and processes data packets coming from a network and then plays multimedia data on a screen. In case of manipulating the IPTV receiver using a remote controller, the IPTV receiver should make a response by sending data packets quickly via a network to obtain corresponding information from a server. In particular, the IPTV receiver is capable of operating to transmit user requested items bi-directionally while processing multimedia data. And, buttons for IPTV can be provided to a remote controller to use the corresponding service well. So, a consumer is able to store and view a fine scene of a drama in the above-provided IPTV receiver and enjoy additional services including location information, hotel reservation and the like.

Meanwhile, the above-mentioned NMS includes the function that a service provider manages a network. And, the NMS helps the service provider control and manage an IPTV receiver of a consumer. If more IPTV receivers are used and if more additional services are provided, the role of the NMS becomes more important. So, SNMP protocol becomes mandatory for an IPTV broadcast receiver. This is intended for a service provider to manage and control an IPTV broadcast receiver. If so, an IPTV broadcast receiver is able to obtain details of statistical data of a currently communicating protocol, information for a currently used processor, information for a TV manufacturer, and the like.

Figure 4:
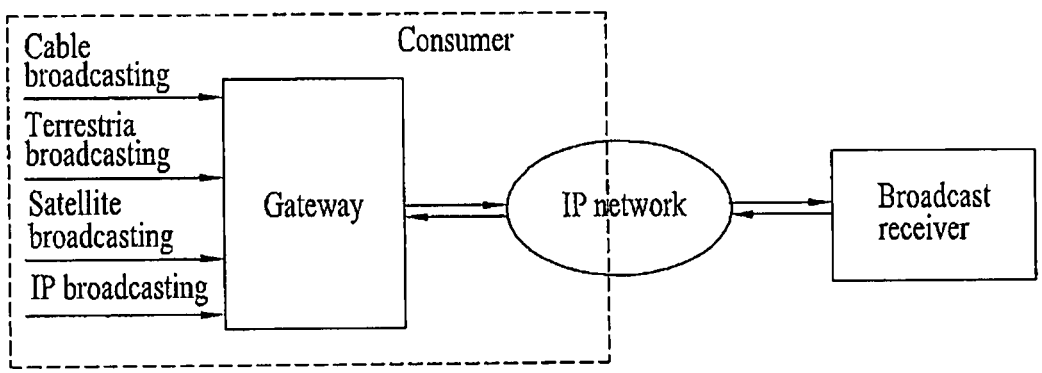
FIG. 4 is a block diagram of a system between a service provider and a broadcast receiver.

FIG. 4 is a block diagram of a system between a service provider and a broadcast receiver.

Referring to FIG. 4, a terminal of a service provider is capable of bi-direction communication via an IP network. In particular, according to the present system, a broadcast receiver is capable of receiving a broadcast from a service provider and also capable of transmitting information for an environment of the broadcast receiver to the service provider.

In this case, when the service provider collects to provide broadcast signals to the broadcast receiver, a broadcast stream can include a single or multi program. In case of attempting to transmit a transport stream via an IP network, IP capsulation is required.

Figure 5:
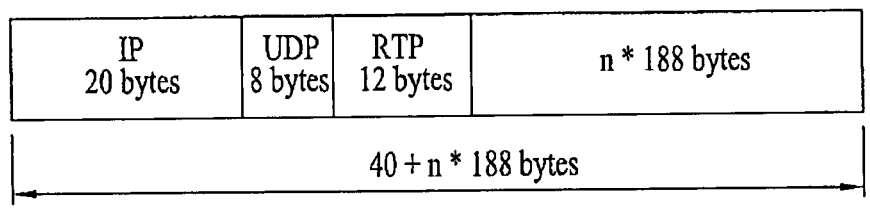
FIG. 5 is a diagram for IP capsulation in case that a service provider provides a service to a broadcast receiver via an IP network.

FIG. 5 is a diagram for IP capsulation in case that a service provider provides a service to a broadcast receiver via an IP network.

Referring to FIG. 5, an IP capsule can include an IP header, a UDP header, an RTP header, and real data, i.e., a transport stream packet.

Figure 6:
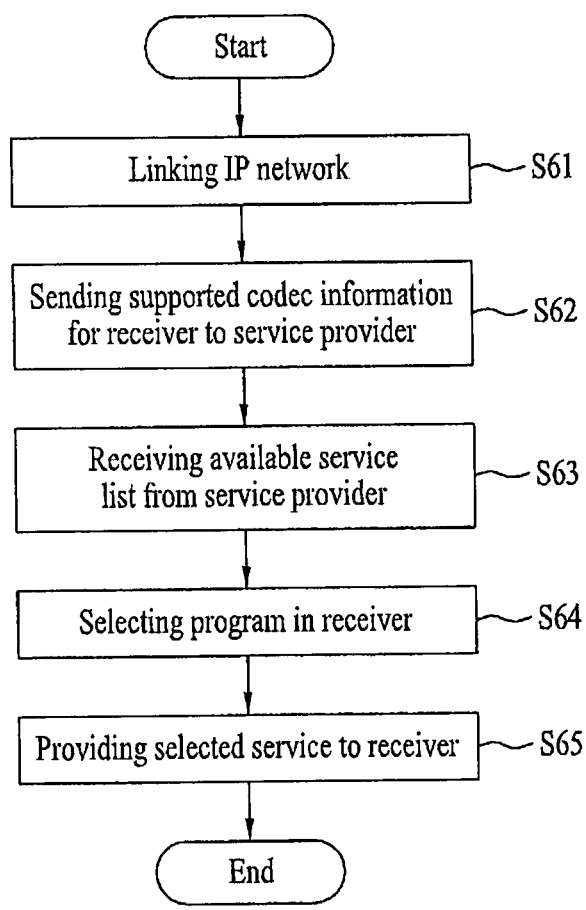
FIG. 6 is a flowchart of a method of receiving an adaptive broadcast signal according to a first embodiment of the present invention.

FIG. 6 is a flowchart of a method of receiving an adaptive broadcast signal according to a first embodiment of the present invention.

Referring to FIG. 6, a method of receiving an adaptive broadcast signal according to a first embodiment of the present invention includes the steps of linking an IP network, transmitting supported codec information for a receiver to a service provider via the linked IP network, receiving an available service information list provided by the service provider based on the supported codec information for the receiver, and if at least one service is selected from the received available service information list by the receiver, providing the selected service to the receiver.

In the IP network linking step (S61), a terminal is connected to the service provider via the IP network. In this case, a service provider designated as a default can be preferentially connected. In case that subscriptions are made to several service providers, it is able to select a specific service provider to be connected.

In the step (S62) of transmitting the supported codec information for the receiver to the service provider, the supported codec information is transmitted to the service provider to be provided with contents encoded by a codec supported by the receiver.

In this case, the supported codec information means various formats that can be decoded by the receiver. For instance, ISO/IEC 11172 Video or ISO/IEC 14496-2 Visual is a supportable codec format of a video stream in a receiver, the codec information is sent to a service provider by the receiver.

In the step (S63) of receiving the available service information list from the service provider, a contents information list of various versions encoded by the codec supported by the receiver is sent to the receiver by the service provider based on the supported codec information having been transmitted to the service provider. For instance, the service provider sends a contents list having at least one version the service provider is equipped with. For instance, the service provider having received the supported codec information of ISO/IEC 11172 Video or ISO/IEC 14496-2 Visual sends a contents list encoded by ISO/IEC 11172 Video or ISO/IEC 14496-2 to the receiver.

In this case, a contents list encoded by codec except the codec retained by the broadcast receiver is entirely sent to enable a user to make a selection. Alternatively, a contents list encoded by codec decodable by the receiver can be sent only.

Optionally, a downloadable codec list can be sent to the receiver while the contents list encoded by codec except the codec retained by the receiver is entirely sent.

If the user selects a program in the receiver (S64), the service provider provides the contents selected by the user (S65). If the user selects a contents program of a specific version to be viewed from the received list, the service provider provides the corresponding service based on an inputted selection signal.

In this case, the user downloads at least one codec from the received downloadable codec list, selects contents encoded by the codec except the codec retained by the related art receiver, and is then provided with the selected contents by the service provider.

If the user selects contents the receiver is unable to support, the service provider can send a message instructing that a corresponding codec should be downloaded to view the corresponding contents. In the receiver having received the download message, the user downloads the corresponding codec or selects the selected contents while downloading the corresponding codec.

Figure 7:
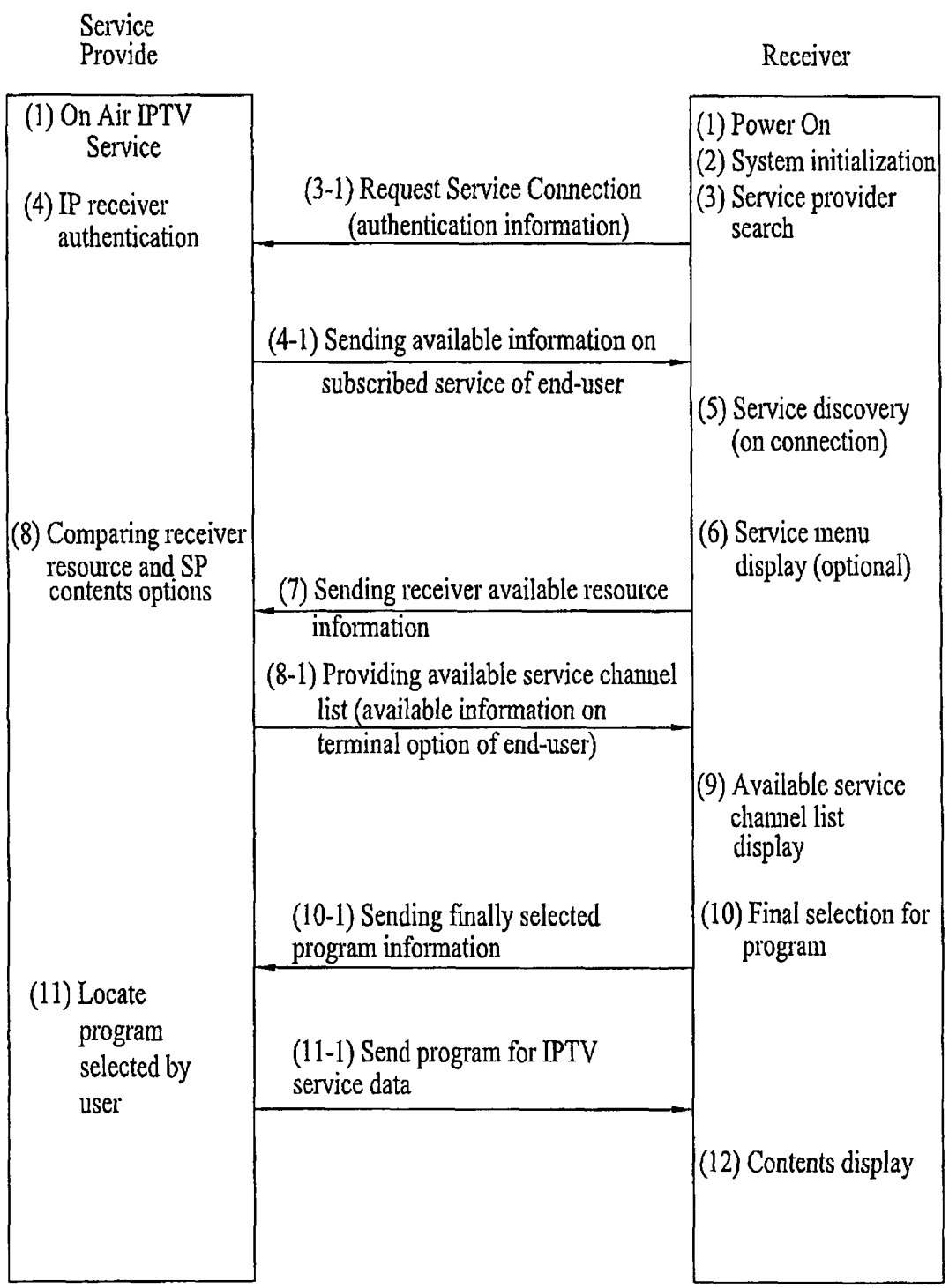
FIG. 7 is a detailed diagram for a method of receiving an adaptive broadcast signal according to a first embodiment of the present invention.

FIG. 7 is a detailed diagram for a method of receiving an adaptive broadcast signal according to a first embodiment of the present invention. A broadcast signal receiving method between a service provider and a broadcast receiver is explained with reference to FIG. 7. In this case, steps explained in the following description are just exemplary but the claims of the present invention are not restricted by the following steps or temporal sequence thereof.

Referring to FIG. 7, while a service provider is providing a broadcast service (1), a power of a broadcast receiver is turned on (1).

If the power of the broadcast receiver is turned on, system initialization is carried out (2).

The system-initialized broadcast receiver searches for a connectable service provider (3) or makes a connection to a service provider set to a default. In case that there are a plurality of connectable service providers, a user is requested to make a selection. If so, the user is able to make a selection.

The broadcast receiver transmits its authentication information while making a request for a service connection to the service provider (3-1).

The service provider having received the authentication information for the broadcast receiver performs a receiver authentication (4).

Once a qualification of the broadcast receiver is authenticated in the authenticating step, available information on a subscribed service is transmitted (4-1). In this case, the available information on the subscribed service means available service information for a receivable physical channel.

The broadcast receiver performs service discovery (5). This is the step of searching a service and deciding a service characteristic. Through this step, the broadcast receiver is connected to the service provider.

The broadcast receiver displays a service menu (6). Hence, the user is able to see an available service on the subscribed services.

The broadcast receiver transmits an available resource, i.e., supported codec information to the service provider (7).

Having received the supported codec information, the service provider compares various versions of retained contents to options of the received supported codec information (8). As a result of the comparison, the service provider sends an available service channel list, which can be outputted from the broadcast receiver, to the broadcast receiver (8-1). In particular, the service provider sends available information for receiver options. In this case, the service provider can transmit a downloadable codec list while sending a contents list encoded by codec not supported by the broadcast receiver.

Having received the available service list from the service provider, the broadcast receiver displays the available service list (9). The user then selects at least one from the available service list (10). In this case, the user selects a channel to view from the available service list and also selects a codec to be outputted from contents of the same channel. In this case, channel selection information can be transmitted together in the step (7) of transmitting the supported codec information for the broadcast receiver. If so, the service provider is able to provide an available service version list for the selected channel.

In this case, if the user selects at least one contents from the contents list encoded by the codec not supported by the broadcast receiver, the service provider sends a message instructing that a codec enabling the corresponding stream to be outputted should be downloaded. If the broadcast receiver downloads the corresponding codec, the selected contents can be provided.

If the selected program information is sent to the service provider (10-1), the service provider searches for a service selected by the user (11) and then provides the searched service to the broadcast receiver (11-1).

Figure 8:
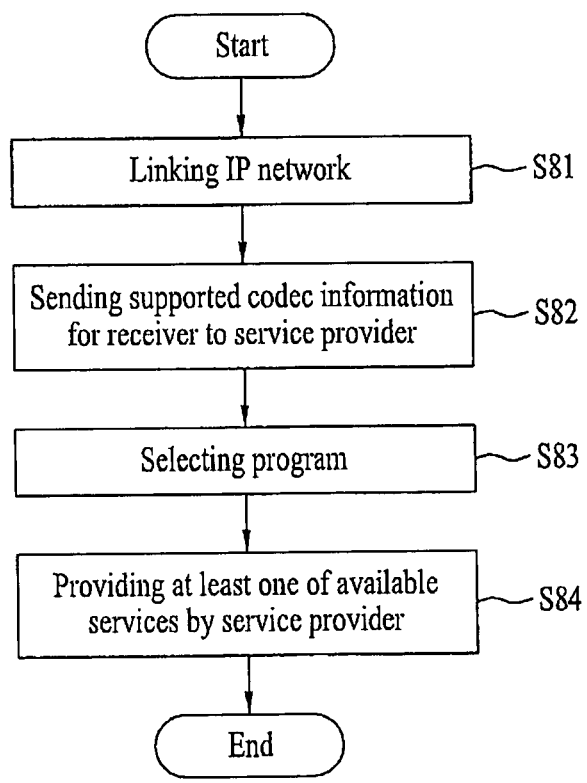
FIG. 8 is a flowchart of a method of receiving an adaptive broadcast signal according to a second embodiment of the present invention.

FIG. 8 is a flowchart of a method of receiving an adaptive broadcast signal according to a second embodiment of the present invention.

Referring to FIG. 8, a method of receiving an adaptive broadcast signal according to a second embodiment of the present invention includes the steps of linking an IP network, transmitting supported codec information for a broadcast receiver and program selection information to a service provider via the linked IP network, and providing the broadcast receiver with at least one service in available service information for a program selected by a user based on the transmitted supported codec information.

The step of linking the IP network and the step of transmitting the supported codec information for the broadcast receiver to the service provider are identical to those of the first embodiment of the present invention. Yet, the second embodiment differs from the first embodiment in that the service provider directly selects a suitable codec version based on the received supported codec information for the broadcast receiver and then provides contents encoded by the corresponding codec to the broadcast receiver instead of selecting a service to be provided to the user from the available service list.

The step of transmitting the supported codec information for the broadcast receiver and the program selection information to the service provider via the linked IP network includes the step (S82) of sending the supported codec information for the broadcast receiver to the service provider and the step (S83) of selecting a program to be viewed by the user.

In particular, the supported codec information and the program selection information, i.e., channel information are sent to the service provider. For instance, the user selects channel-10 and the supported codec information is provided as well.

The service provider selects at least one service from available services and then provides the selected service to the broadcast receiver (S84). In particular, one of the contents encoded by the codec supportable by the broadcast receiver in the channel-10 selected by the user is selected and then provided to the broadcast receiver.

In this case, if the service provider does not retain the contents encoded by the codec supported by the broadcast receiver, the service provider sends a message instructing to download a codec enabling a corresponding stream to be outputted. If the broadcast receiver having received the message downloads the corresponding codec, the service provider provides the corresponding contents to the broadcast receiver.

Figure 9:
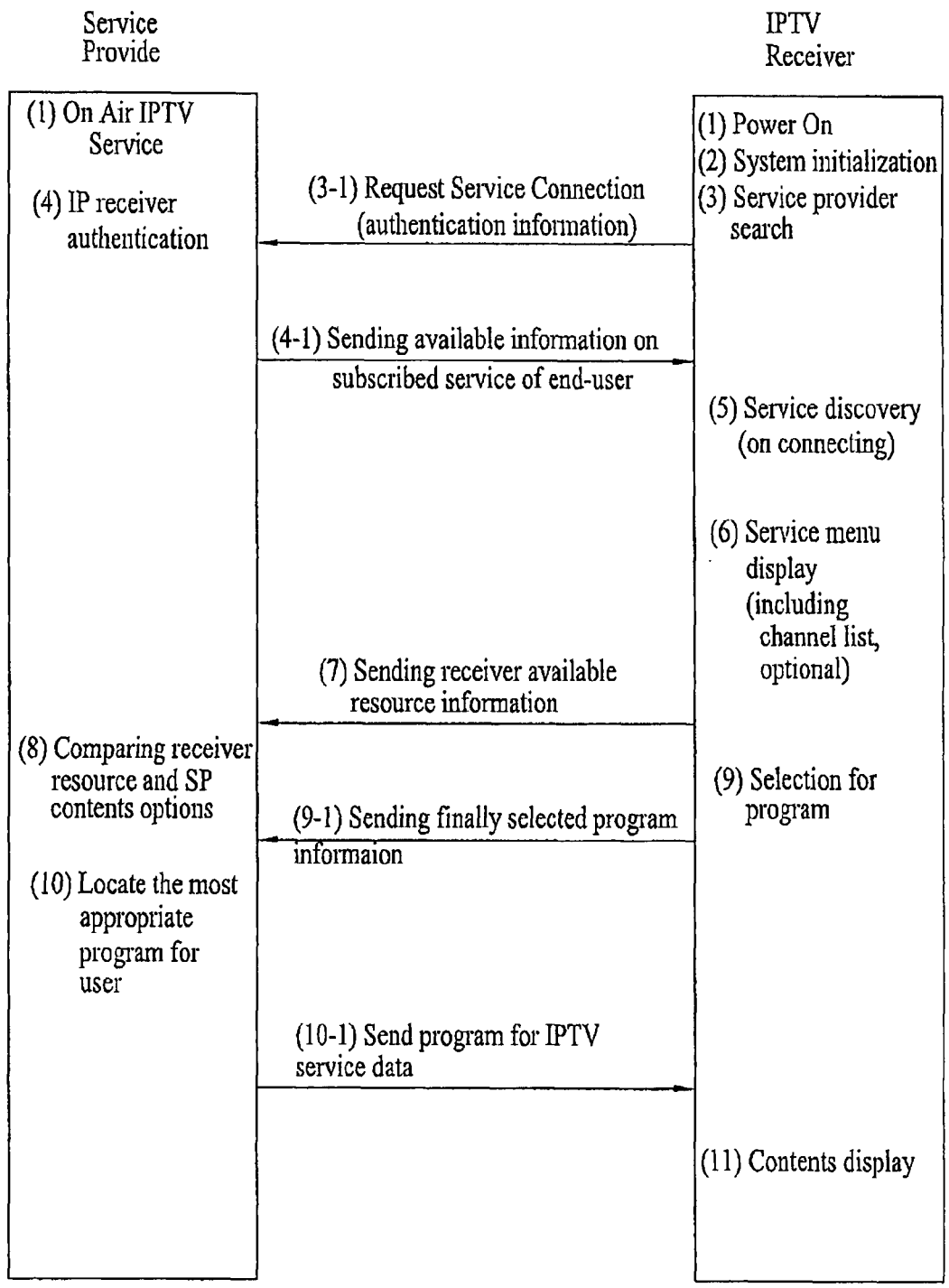
FIG. 9 is a detailed diagram for a method of receiving an adaptive broadcast signal according to a second embodiment of the present invention.

FIG. 9 is a detailed diagram for a method of receiving an adaptive broadcast signal according to a second embodiment of the present invention. A broadcast signal receiving method between a service provider and a broadcast receiver is explained with reference to FIG. 9. In this case, steps explained in the following description are just exemplary but the claims of the present invention are not restricted by the following steps or temporal sequence thereof.

Referring to FIG. 9, steps (1) to (6) are identical to those of the first embodiment of the present invention. In the following description, steps after the step (6) are explained.

First of all, a broadcast receiver sends its available resources, i.e., supported codec information to a service provider (7).

Having received the supported codec information, the service provider compares various versions of the retained contents to options of the supported codec information (8).

The broadcast receiver receives a program selection signal of the user (9) and then sends finally selected program selection information to the service provider (9-1). In this case, the program selection in the broadcast receiver and the selection signal sending to the service provider can be carried out before the option comparing step (8) in the service provider.

In particular, the supported codec information is sent (7), the corresponding option comparison is carried out (8), and the finally selected program information is then sent. Alternatively, the supported codec information and the finally selected program information are selected and the option comparison can be then carried out on the retained contents for the selected program.

If the selected program information is sent to the service provider (9-1), the service provider searches for contents encoded by the codec to be outputted by the broadcast receiver a result of the option comparison and then provides the searched contents to the broadcast receiver, for the selected program (10-1).

The broadcast receiver having received the contents provided by the service provider displays the received contents (11).

In this case, if the service provider does not retain the contents encoded by the supported codec of the broadcast receiver, the service provider sends a message instructing to download a codec enabling a corresponding stream to be outputted. For instance, in case that the broadcast receiver is able to output contents encoded by ISO-IEC 11172 Video or ISO/IEC 14496-2, if the service provider retains contents encoded by SMPTE 421M Video only, the service provider sends a message instructing to download SMPTE 421 Video codec to the broadcast receiver.

If the broadcast receiver having received the message downloads the corresponding codec, the service provider provides the broadcast receiver with the contents encoded by SMPTE 421M Video.

In the first embodiment of the present invention, once the supported codec information for the broadcast receiver is provided to the service provider, the service provider sends the available service information list to the broadcast receiver. If so, the user selects the contents encoded by the finally outputted codec. Namely, the codec version to be finally outputted is selected by the user.

On the contrary, in the second embodiment of the present invention, if the supported codec information for the broadcast receiver is provided to the service provider, the service provider selects at least one of the contents encoded by the codec supported by the broadcast receiver and then provides the selected contents to the broadcast receiver. Namely, the codec be finally outputted is selected by the service provider.

FIG. 10 is a diagram of a data structure to send resource information for a broadcast receiver to a service provider from the broadcast receiver according to an embodiment of the present invention.

Referring to FIG. 10, resolution information, audio codec information, video codec information, network information, and user level information for a broadcast receiver can be sent.

FIG. 11 is a diagram for encoding of codec information to support a service provider with supported codec information according to one embodiment of the present invention.

Data structures shown in FIG. 12 and FIG. 13 are explained with reference to FIG. 11 as follows.

FIG. 12 is a diagram of a data structure to send supported codec information for a broadcast receiver to a service provider from the broadcast receiver according to an embodiment of the present invention.

Referring to FIG. 12, a video codec (VC) or audio codec (AC) data structure is a means for informing a service provider of information for a codec decodable by a broadcast receiver. And, decodable codec information for each program or contents is included in the data structure. In the following description, a video codec (VC) data structure is explained as an embodiment.

The VC data structure is rendered to include information such as a code value, a text and the like to specify and represent a codec supported by a broadcast receiver. For instance, if ISO-IEC 11172 Video or ISO/IEC 14496-2 Visual is used as a video codec decodable by a broadcast receiver, it can be inserted in the data structure as characters or a code value (code_value) set to 0 or 2 in FIG. 11.

FIG. 13 is a diagram of a data structure for indicating available service information sent by a service provider to a broadcast receiver according to an embodiment of the present invention, in which a video codec (VC) data structure is shown.

Referring to FIG. 13, a VC structure is a means for sending codec information for encoding a broadcast stream in sending an available service channel list or an available program list to a broadcast receiver from a service provider. The present data structure represents what kind of codec is used to encode a specific program.

Like the former VC data structure shown in FIG. 12, a service provider sends encoding information for a retained broadcast stream to a broadcast receiver. In this case, if the broadcast receiver does not have a codec to decode the retained broadcast stream, the service provider is able to send a message instructing the broadcast receiver to download a corresponding codec.

Having received the download message, the broadcast receiver downloads the corresponding codec, receives the selected contents, and then outputs the received contents.

Figure 14:
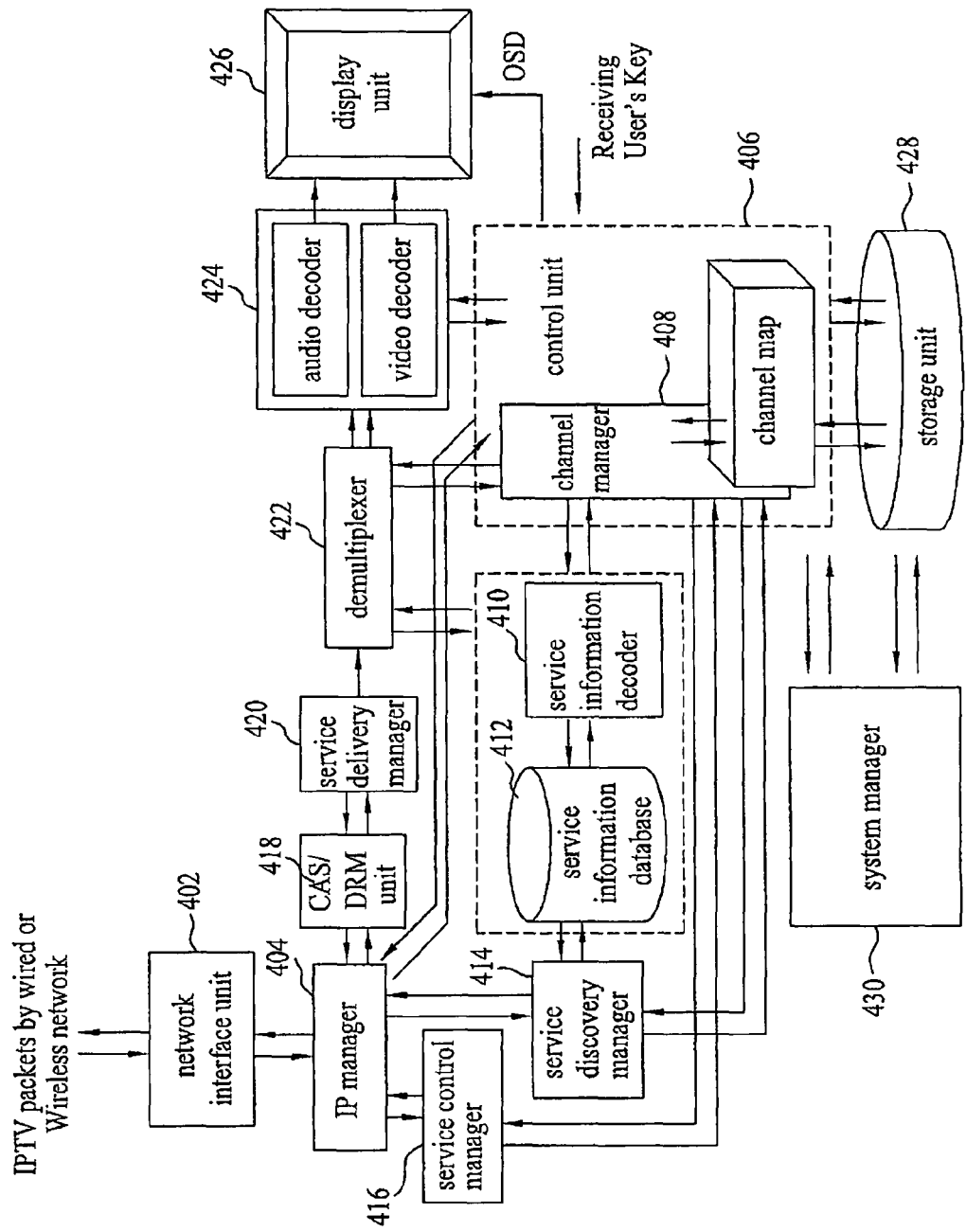
FIG. 14 is a block diagram of an adaptive broadcast receiver according to one embodiment of the present invention.

FIG. 14 is a block diagram of an adaptive broadcast receiver according to one embodiment of the present invention.

Referring to FIG. 14, an adaptive broadcast receiver according to one embodiment of the present invention includes a network interface unit transceiving a broadcast stream capsulated into an IP packet by connecting the broadcast receiver to a service provider via a network, a control unit controlling a version of contents encoded by a codec decodable by the broadcast receiver to be received in a manner of sending supported codec information for the broadcast receiver to the service provider via the network interface unit, a decoder decoding the received broadcast stream, and a display unit outputting the broadcast stream decoded by the decoder.

Detailed configuration of the broadcast receiver is explained as follows.

First of all, the broadcast receiver includes a network interface unit 402, an IP manager 404, a control unit 406, a channel manager 408, a service information decoder 410, a service information database 412, a service discovery manager 414, a service control manager 416, a CAS/DRM unit 418, a service delivery manager 420, a demultiplexer 422, an audio/video decoder 424, a display unit 426, a storage unit 428, and a system manager 430.

The network interface unit 402 receives packets received from a network and transmits a packet to the network from the broadcast receiver. In particular, the network interface unit 402 receives an adaptive broadcast signal of the present invention from a service provider of the present invention via the network.

The IP manager 404 manages a packet delivery to a destination from a source for the packets received or transmitted by the broadcast receiver. And, the IP manager 404 sorts the received packets to correspond to a suitable protocol.

The control unit 406 controls an application and an overall operation of the broadcast receiver according to a user input signal by controlling a user interface (not shown in the drawing). The control unit 406 provides a graphic user interface (GUI) for a user using an OSD (on screen display) or the like. The control unit 406 receives an input signal from the user and then performs a receiver operation according to the corresponding input. For instance, if a key input concerning a channel selection is inputted by a user, the control unit 406 sends a channel selection input signal to the channel manager 408.

The control unit 406 controls a version of contents encoded by a codec decodable by the broadcast receiver to be received in a manner of sending supported codec information for the broadcast receiver to the service provider via the network interface unit 402.

The channel manager 408 stores received channel information and then generates a channel map. The channel manager 408 selects a channel according to the key input received from the control unit 406 and controls the service discovery manager 414.

The channel manager 408 receives service information for a channel from the service information decoder 410 and performs audio/video PID (packet identifier) setting of the selected channel on the demultiplexer 422.

The service information decoder 410 decodes such service information as PSI (program specific information). In particular, the service information decoder 410 receives and decodes PSI table, PSIP (program and service information protocol) table, DVB-SI (service information) table or the like demultiplexed by the demultiplexer 422.

The service information decoder 410 decodes the received service information tables, generates a database for the service information, and then stores the generated database for the service information in the service information database 412.

The service discovery manager 414 provides information necessary to select a service provider which provides a service. If a signal for a channel selection is received from the control unit 406, the service discovery manager 414 searches for a service provider using the information.

The service control manager 416 is responsible for a selection and control of a service. For instance, if a user selects a live broadcasting service as good as a conventional broadcasting type, the service control manager 416 performs the selection and control of the service using IGMP or RTSP. If a user selects such a service as VOD (video on demand), the service control manager 416 performs the selection and control of the service using RTSP. In this case, the RTSP (real-time streaming protocol) can provide a trick mode for a real-time streaming.

The packet for the service received via the network interface unit 402 and the IP manager 404 is sent to the CAS/DRM unit 418. The CAS/DRM unit 418 is responsible for CAS (conditional access system) of service and DRM (digital rights management).

The service delivery manager 420 is responsible for control of the received service data.

For instance, in case of controlling real-time streaming data, RTP/RTCP (real-time transport protocol/RTP control protocol) is used. If the real-time streaming data is transported using the RTP, the service delivery manager 420 parses the received data packet according to the RTP and then sends the parsed packet to the demultiplexer 422. And, the service delivery manager 420 feeds back the network reception information to a server side providing the service using the RTCP. In this case, the real-time streaming data can be capsulated by UDP without RTP and then directly delivered.

The demultiplexer 422 demultiplexes the received packet into audio data, video data and PSI (program specific information) data and then sends the data to the video/audio decoder 424 and the service information decoder 410, respectively.

The video/audio decoder 424 decodes the video and audio data received from the demultiplexer 422. And, the video/audio data decoded by the video/audio decoder 424 is provided to the user via the display unit 426.

The storage unit 428 stores setup data for system and the like. In this case, the storage unit 428 can include a nonvolatile memory such as a nonvolatile RAM (NVRAM), a flash memory, and the like.

And, the system manager 430 controls overall operations of the broadcast receiver via a power system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving an adaptive broadcast signal, comprising the steps of:
    linking an IP network;
    connecting to a service provider via the linked IP network, wherein an authentication process is performed, available services based on capability of a receiver are displayed;
    sending supported encoding information of the receiver to the service provider when performing service discovery;
    receiving service selection data including a list about an available media service for the receiver from the service provider, the service selection data being customized by the service provider based on the sent supported encoding information;
    displaying the list which specifies at least one content of the available media service and at least one supported encoding format which is related to the at least one content;
    sending selected content information indicating a content and a supported encoding format of the content when a user selects the content and the supported encoding format of the content from the displayed list;
    receiving the content of an encoding format suitable for the receiver from the service provider; and
    wherein if media codec information for contents provided by the service provider is not matched to the supported encoding information of the receiver, receiving a downloadable codec list provided by the service provider, comprising:
        selecting at least one codec from the received downloadable codec list; and
        downloading the selected at least one codec from the service provider,
    wherein the encoding information includes audio encoding information specifying supported audio encoding properties and video encoding information specifying supported video encoding properties, and
    wherein in the step of selecting the at least one service from the list about an available media service in the receiver, a user codec selection signal is inputted via an OSD.

2. The method of claim 1, wherein in the step of sending the supported encoding information of the receiver to the service provider via the linked IP network, a data structure representing the supported encoding information of the receiver as at least one selected from the group comprising of a code value (code_value) field, a text field, and a format type (format_type) field is sent to the service provider.

3. The method of claim 1, wherein in the step of sending the supported encoding information of the receiver to the service provider via the linked IP network, service selection information is provided to the service provider together with the supported encoding information of the receiver.

4. The method of claim 1, wherein the service selection data including a list about an available media service comprises at least one encoding list for a selected service.

5. The method of claim 1, wherein in the step of receiving the service selection data including a list about an available media service provided by the service provider based on the supported encoding information for the receiver, a data structure representing the service selection data including a list about an available media service of the receiver as at least one selected from the group comprising a code value (code_value) field, a text field, a field format type (format_type) field, a height field and a weight field is received.

6. An adaptive IPTV receiver comprising:
    a network interface unit transceiving a broadcast stream capsulated into an IP packet by connecting the IPTV receiver to a service provider via a network;
    a decoder decoding the received broadcast stream;
    a display unit outputting the broadcast stream decoded by the decoder, wherein an authentication process is performed, the display unit is configured to display available services based on capability of the IPTV receiver; and
    a control unit controlling the network interface to send supported encoding information of the IPTV receiver to a service provider when performing service discovery, to receive service selection data including a list about an available media service for the IPTV receiver which is customized based on the sent supported encoding information of the IPTV receiver, to send selected content information indicating a content and a supported encoding format of the content when a user selects the content and the supported encoding format of the content and to receive the content of an encoding format suitable for the receiver from the service provider, wherein in the step of selecting the at least one service from the list about an available media service in the receiver, a user codec selection signal is inputted via an OSD;

wherein the encoding information includes audio encoding information specifying supported audio encoding properties and video encoding information specifying supported video encoding properties, wherein the control unit further controls the display unit to display the list which specifies at least one content of the available media service and at least one supported encoding format which is related to the at least one content, and wherein if media codec information for contents provided by the service provider is not matched to the supported encoding information of the receiver, receiving a downloadable codec list provided by the service provider, comprising:

selecting at least one codec from the received downloadable codec list; and downloading the selected at least one codec from the service provider.

7. The adaptive IPTV receiver of claim 6, further comprising an IP manager unit managing a packet delivery to a destination from a source for a packet received via the network interface unit and a packet sent by the IPTV receiver.

8. The adaptive IPTV receiver of claim 6, further comprising:

a service discovery manager providing information necessary to select the service provider providing a service; and a service control manager responsible for a selection and control of the service.

* * * * *